United States Patent
Kauppi

[11] Patent Number: 5,953,667
[45] Date of Patent: *Sep. 14, 1999

[54] LOCATION UPDATING IN A CELLULAR RADIO NETWORK

[75] Inventor: Hanna-Maria Kauppi, Espoo, Finland

[73] Assignee: Nokia Telecommunications OY, Espoo, Finland

[*] Notice: This patent issued on a continued prosecution application filed under 37 CFR 1.53(d), and is subject to the twenty year patent term provisions of 35 U.S.C. 154(a)(2).

[21] Appl. No.: 08/859,417

[22] Filed: May 20, 1997

Related U.S. Application Data

[63] Continuation of application No. 08/403,701, filed as application No. PCT/FI93/00371, Sep. 15, 1993, abandoned.

[30] Foreign Application Priority Data

Sep. 18, 1992  [FI]  Finland ..................................... 924199

[51] Int. Cl.$^6$ ....................................................... H04Q 7/20
[52] U.S. Cl. ........................ 455/440; 455/417; 455/671; 455/435
[58] Field of Search ..................................... 455/417, 432, 455/435, 440, 422, 426, 67.1

[56] References Cited

U.S. PATENT DOCUMENTS

| | | | |
|---|---|---|---|
| 4,737,978 | 4/1988 | Burke et al. | 379/60 |
| 4,775,999 | 10/1988 | Williams | 379/59 |
| 5,054,110 | 10/1991 | Comroe et al. | 455/33 |
| 5,629,975 | 5/1997 | Tiedemann | 455/435 |

FOREIGN PATENT DOCUMENTS

| | | |
|---|---|---|
| 0260763 | 3/1988 | European Pat. Off. . |
| 0475865 | 3/1992 | European Pat. Off. . |

*Primary Examiner*—Reinhard J. Eisenzopf
*Assistant Examiner*—Darnell R. Armstrong
*Attorney, Agent, or Firm*—IP Group of Pillsbury; Madison & Sutro LLP

[57] ABSTRACT

In a cellular radio network in which mobile stations roam, in addition to location updating of each mobile station with the accuracy of one location area, a so-called temporary subscriber-specific paging area is determined. Each mobile station initiates the determining of the temporary paging area in the subscriber data base of the cellular radio network after being located in a cell for a sufficiently long period. The temporary paging area is smaller than the location area (e.g., one cell and possibly at least one adjacent cell), and thus the paging of a mobile station can be focused on a small area, i.e., the temporary paging area. It is thus unnecessary to page over the entire location area, and paging time can be reduced and capacity of the cellular radio network spared.

1 Claim, 3 Drawing Sheets

LOCATION UPDATING IN A CELLULAR RADIO NETWORK

This is a continuation of application Ser. No. 08/403,701, filed on Mar. 17, 1997, now abandoned, which is a 371 of PCT/FI93/00371, filed Sep. 15, 1993.

FIELD OF THE INVENTION

The invention relates to cellular radio networks and particularly to location updating in the cellular radio networks.

BACKGROUND OF THE INVENTION

At present, various cellular or mobile radio systems are in use or under development. When a mobile station (MS) is located in a cell, it communicates with the fixed network through a fixed radio station or base station located in the cell. The mobile stations belonging to the cellular system are allowed to roam freely within the area of the cellular system from one cell to another. The cellular radio network usually has information about the location of the MS with the accuracy of a so-called location area, which includes a suitable number of predetermined cells and their base stations. The location area data transmitted by the base station indicates to the MS the location area of the base station. When the MS changes a cell within the same location area, no updating of the location for the cellular radio network is necessary. Instead, when the MS detects on the basis of the location area data that the location area changes with the new base station, the MS initiates location updating by transmitting a location updating request to the cellular radio network. Due to the location updating request, the cellular radio network updates the new location area of the MS to a subscriber database.

As the location of the MS is known only with the accuracy of one location area, the MS has to be paged in all cells within the location area in question for the setup of an incoming call. This causes a considerable signalling load in the radio network between the mobile exchange and the base stations, as well as over the radio path. On the other hand, if the size of the location area is reduced to avoid the above drawback, the MS changes the location area more often; and so the location updating frequency of the subscribers and associated signalling increase. At present there is a tendency to enlarge location areas to reduce location updating.

When location areas are large, it may be advantageous to divide them into smaller paging areas. Since the location of the subscriber is known only with the accuracy of one location area, the first paging may even here be directed to a wrong location area; in the worst case the subscriber may not be found until the paging has proceeded to the last paging area. To reduce the signalling load, measures are needed even here to focus the paging of a subscriber on a small area and yet to maximize the probability of successful paging.

SUMMARY OF THE INVENTION

The object of the present invention is a cellular radio network with a reduced signalling load caused by paging of a subscriber.

This is achieved with a cellular radio network comprising mobile stations roaming in the cellular radio network and means for storing information about the location of the mobile stations for paging in the cellular radio network with the accuracy of one location area consisting of a plurality of cells, characterised in that the mobile station comprises timing means, which start to operate as the mobile station enters a cell and, when the mobile station has stayed in the cell for at least a predetermined period, activate the mobile station to initiate in the cellular radio network a procedure in which the cellular radio network determines a temporary paging area within the current location area of the mobile station and stores the temporary paging area in the location data; the temporary paging area comprising at least the current location cell and possibly at least one adjacent cell, and any subsequent pagings of the mobile station being conducted first in said temporary paging area until the mobile station has entered a new location area or initiated determining of a new temporary paging area.

The invention also relates to a mobile station in a cellular radio network comprising mobile stations roaming in the cellular radio network and means for storing information about the location of the mobile stations for paging in the cellular radio network with the accuracy of one location area comprising a plurality of cells. In the invention, the mobile station comprises timing means, which start to operate as the mobile station enters a cell and, when the mobile station has stayed in the cell for at least a predetermined period, activate the mobile station to initiate in the cellular radio network a procedure in which the cellular radio network determines a temporary paging area within the current location area of the mobile station and stores the temporary paging area in the location data; the temporary paging area comprising at least the current location cell and possibly at least one adjacent cell.

In addition to location updating of the MS with the accuracy of one location area, a basic idea of the invention is to determine a so-called temporary subscriber-specific paging area. The MS initiates the determining of such a temporary paging area in the subscriber database of the cellular radio network after being located in an area smaller than the location area, perhaps only one or a few cells large, for a sufficiently long period. Due to this, when the location area has been detected, the paging of the MS can be focused on a small area, i.e. the temporary paging area. It is thus unnecessary to page over the entire location area, and paging time can be reduced and capacity of the cellular radio network spared. If the MS is not found in this determined temporary paging area, paging can be conducted in the remaining parts of the location area. It is then possible to further reduce signalling in the cellular radio network by paging in the remaining areas gradually, starting, e.g., from the cells/paging areas adjacent to the temporary paging area.

BRIEF DESCRIPTION OF THE DRAWINGS

The invention will be described by means of exemplifying embodiments with reference to the attached drawing, in which.

A DETAILED DESCRIPTION OF THE INVENTION

The present invention may be applied to any cellular system, such as GSM (Global System for Mobile Communications), NMT (Nordic Mobile Telephone), DCT 1800, PCN (Personal Communication Network), UMC (Universal Mobile Communication), UMTS (Universal Mobile Telecommunication System), and FPLMTS (Future Public Land Mobile Telecommunication System).

As is well known, the geographical area covered by a cellular radio network is divided into smaller separate radio areas or cells. When a mobile station MS resides in a cell, it communicates with the network through a fixed radio station or base station BS located in the cell. The mobile stations MS belonging to the system are allowed to roam freely within the system from one cell to another. However, the cellular radio network has to have information about the actual location of the MS to be able to route the incoming calls to the MS or to page the MS for some other reason. Typically, the cellular network has the location data of the MS with the accuracy of a larger area, generally known as a location area, comprising several cells.

The base stations of the cellular network continuously transmit information about themselves and their surroundings, the information including LAI (Location Area Identifier), BSI (Base Station Identifier), BSTI (Base Station Type Identifier), and so-called adjacent cell data. On the basis of the location area identifier transmitted by a base station BS, an MS residing in a cell can identify the location area of that BS. If the MS detects that the LAI changes as the BS changes, i.e. the location area changes, the MS initiates location updating by sending a location updating request to the cellular radio network. On the other hand, if the location area does not change, the MS does not initiate location updating.

Location updating causes updating of subscriber data of the MS in question in the subscriber database(s) of the cellular radio network. For example, in the GSM illustrated in FIG. 1, the cellular radio network comprises at least a home location register (HLR), visitor location registers (VLR), mobile exchanges (MSC) and base station controllers (BSC) connected to the base stations (BTS) of the network. The location area data of the MS are stored in a visitor location register VLR. Typically one VLR is provided for each mobile exchange MSC. A home location register HLR contains information about the VLR that the MS is visiting. The structure and operation of the GSM are described more closely in this respect e.g. in patent application Ser. No. 921,074. Apart from the centralized database structure described above, the cellular radio system may also have some kind of decentralized database structure.

Figure 1:
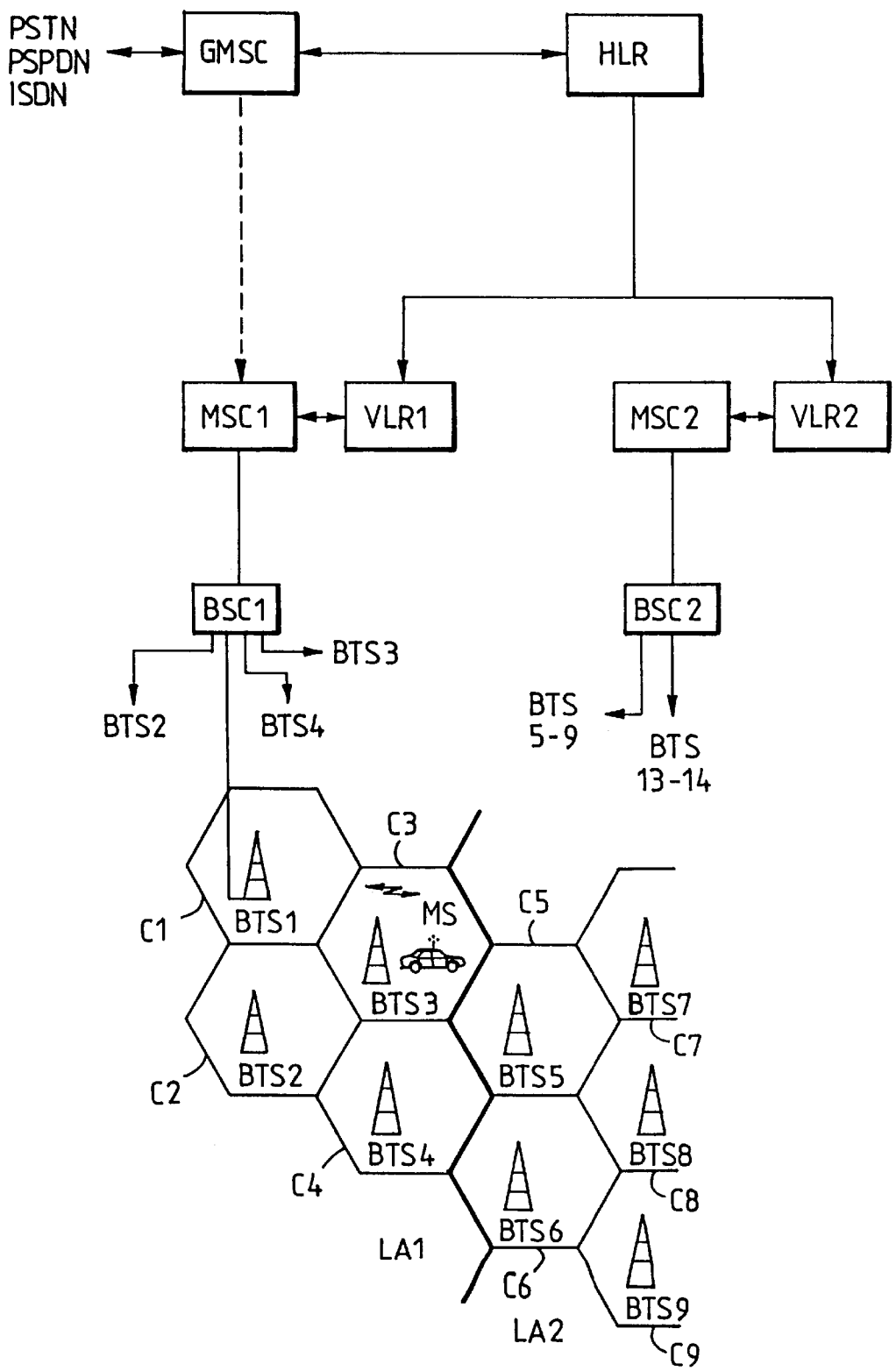
FIG. 1 shows a general view of a cellular radio network in which the present invention is applied.

For the sake of clarity, FIG. 1 shows only two location areas LA1 and LA2, the former being within the area of the mobile exchange MSC1 and the latter, of the mobile exchange MSC2. The area of one MSC typically comprises a plurality of location areas. The location area LA1 comprises e.g. cells C1 to C4, which include base stations BTS1 to BTS4 respectively. The location area LA2 comprises e.g. cells C5 to C9, which include base stations BTS5 to BTS9 respectively. An MS roaming in a cell C provides a two-way radio connection with the base station BTS of the cell concerned. The traffic in the location areas LA1 and LA2 is controlled by the base station controllers BSC1 and BSC2 respectively.

As stated above, the cellular networks typically have information about the location of the MS with the accuracy of one location area. To determine the more accurate location of the MS within the location area, the paging of the MS in conventional cellular radio networks is conducted through all the base stations in the location area. Alternatively, it has also been possible to conduct paging in fixed paging areas smaller than the location area without having information about the actual area in which the MS is located; because of this, paging may have to be conducted in several paging areas before the MS is found.

This increases the signalling load in the cellular radio network and prolongs paging times. In a cellular radio network according to the invention an MS is capable of initiating the determining of a temporary user-specific paging area in the cellular radio network; consequently the cellular radio network stores in its subscriber databases the location area and its fixed paging area or information about the cell in which the MS is located upon initiating the determining of a temporary paging area. A temporary paging area is thus always smaller than the location area; it comprises at least the cell in which the MS is currently located and possibly a few adjacent cells. On account of this, subsequent pagings of the MS can be focused on a small area within the location area where the MS is most likely to be located.

Figure 2:
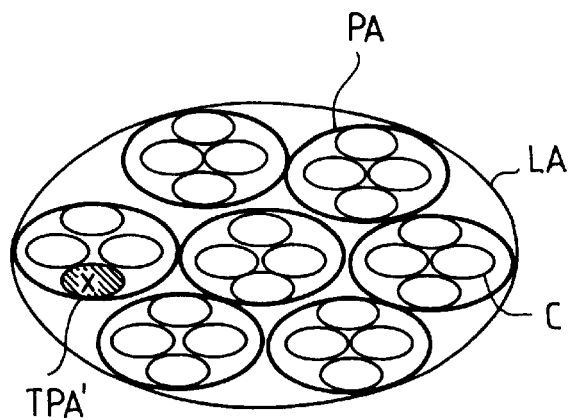
FIGS. 2, 3 and 4 show an alternative type of location area, in which the location area consists of fixed paging areas comprising a few cells.
Figure 3:
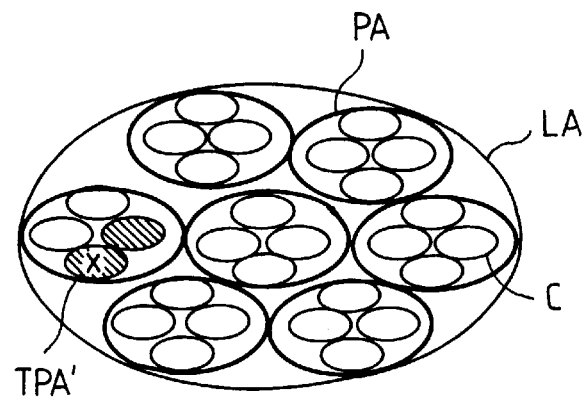
Figure 4:
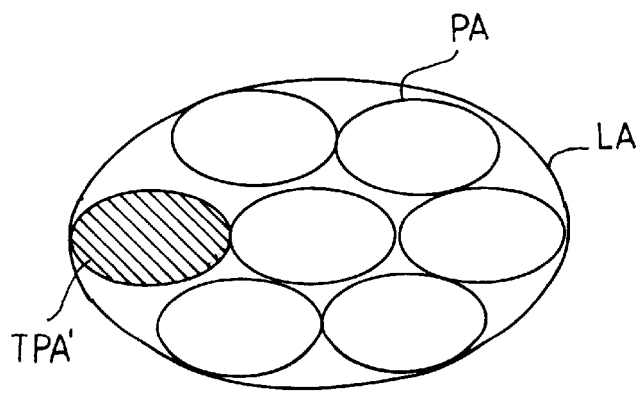

The operation of the invention is now described in greater detail with reference to FIGS. 2, 3 and 4. The location areas LA are shown to comprise a plurality of smaller fixed paging areas PA, each of which comprises one or more cells C. With reference to FIG. 2, it is assumed that the MS is within the location area LA and roams into a cell C within a paging area PA, the cell being marked with letter X. When the MS enters the cell X, it detects the change of cell e.g. by a base station identifier BSI and starts its internal timer, which measures the time spent in the cell. When the MS has stayed in the cell X for a predetermined time, i.e. the internal timer of the MS has reached a predetermined value, the timer activates the MS to send an initiation message to the cellular radio network. The initiation message initiates a procedure in the cellular radio network for determining the temporary paging area of the MS and for storing the temporary paging area in the subscriber database of the network. The temporary paging area may be, e.g.:

a) the current location cell X of the MS (shaded area TPA' in FIG. 2), b) the current location cell of the MS and at least one adjacent cell (shaded areas TPA' in FIG. 3), or c) a fixed paging area PA in the network, to which the current location cell X of the MS belongs (shaded area TPA' in FIG. 4).

In alternative a), in which only information about the temporary location cell X of the MS is stored in the subscriber database, the cellular radio network looks for data about the location area and the location cell X in the subscriber database during the subsequent paging of the MS, and can on the basis of the data found page the MS either only in the stored location cell X or—to enhance the probability of successful paging—both in the stored location cell X and in an adjacent cell or adjacent cells, or over the entire paging area PA of the network to which the stored location cell X belongs. The most flexible way of storing a temporary paging area TPA' in the cellular network is the one described in alternative a) since it is not until the actual paging that it has to be decided in how large an area paging will be conducted.

In alternative b), in which the location cell X of the MS and at least one adjacent cell are stored in the subscriber database, the subsequent paging of the MS is conducted primarily in the cells in question.

In alternative c), in which data about a fixed paging area PA determined on the basis of the current location cell of the MS is stored in the subscriber database, the cellular radio network conducts the subsequent paging of the MS directly in the paging area PA indicated by said stored data.

Alternatives a) and b) show flexible ways of using a temporary paging area TPA' since they are also well applicable to cases where the configuration of a paging area PA within a location area LA is varied dynamically. Alternatives a) and b) can also be applied when the location area LA of the network does not have a specific structure of paging areas PA, whereby paging is focused with the accuracy of one or a few cells. This is the case, e.g. with the present GSM cellular radio system.

In all alternatives a), b) and c), paging is extended to the remaining areas of the location area LA if the MS is not found in the first paging in the temporary paging area TPA'. The paging may then be immediately extended over the entire location area, e.g. by conducting a new paging first in the paging areas PA adjacent to the temporary paging area TPA'.

The temporary paging area TPA' of the MS determined in the above-described manner in the subscriber database of the cellular radio network does not change until the MS enters another location area LA and conducts normal location updating, or until the MS enters a new cell C and stays there for so long that the internal timer of the MS initiates the determining of a new temporary paging area for the MS.

Since all modern mobile stations are controlled by microprocessors, the timer and other necessary functions according to the invention can easily be embodied by means of softwear in a manner obvious to one skilled in the art. The procedure for determining a temporary paging area may be, e.g., modified from the conventional procedure for location updating.

Figure 5:
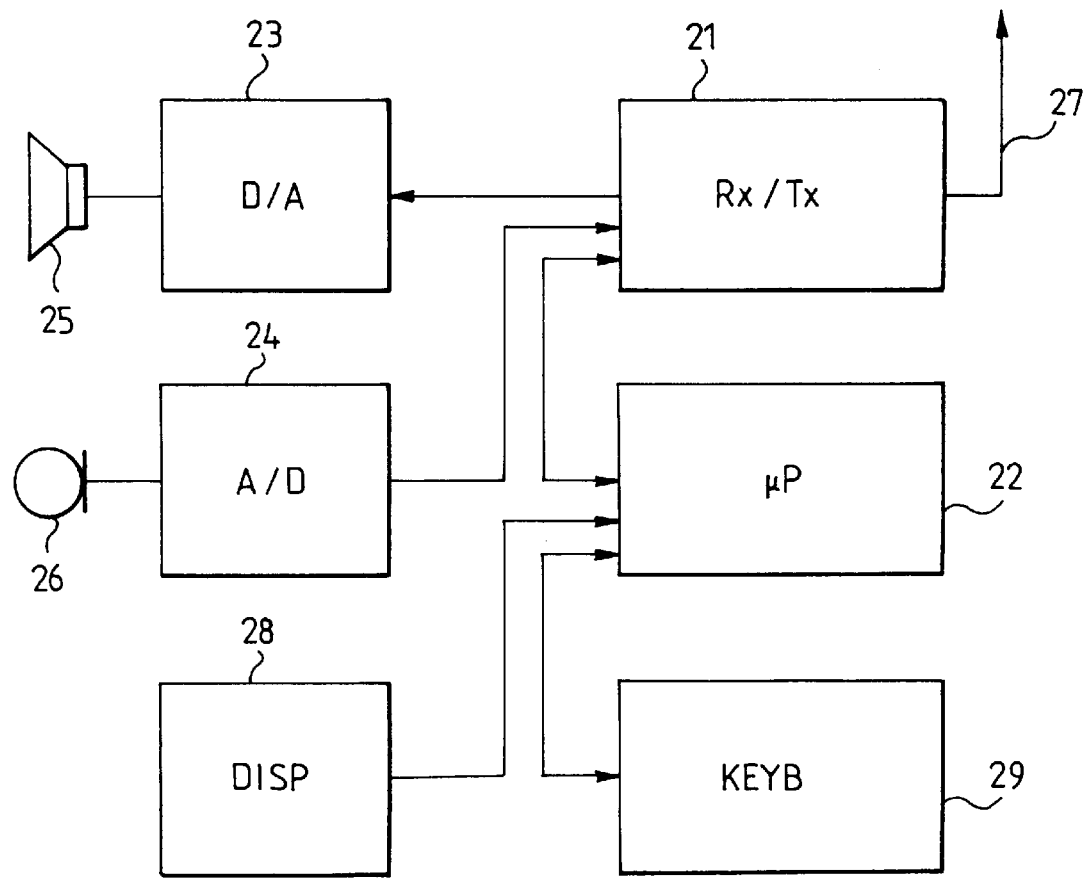
FIG. 5 shows a general block diagram of a roaming mobile station.

FIG. 5 shows a general block diagram of a mobile station MS to which the invention may be applied. The MS comprises a transceiver 21 connected to an antenna 27, the receiver being connected to a loudspeaker 25 via digital analog and baseband circuits 23 and the transmitter being connected to a microphone 26 via analog digital converter and baseband circuits 24. The operation of the MS is controlled by a microprocessor 22, which processes the signalling transmitted and received by the transceiver. The user interface comprises a display 28 and a key board 29, which are connected to the microprocessor 22. The invention can be carried out by modifying the software of the microprocessor 22 in such a way that it performs the operations described above.

The drawig figures and the associated description are only intended to illustrate the present invention. In its details, the cellular radio network and mobile station according to the invention may vary within the scope of the attached claims.

I claim:

1. A cellular radio network, comprising:

a plurality of fixed location areas, each location area consisting of a plurality of cells;

a plurality of mobile stations roaming in the cellular radio network; and means for storing, as location data including respective current location areas, information about the locations of said mobile stations for paging in the cellular radio network with the accuracy of one location area;

each of said mobile stations being arranged to update the location data in said means when said respective mobile station moves from one of said location areas to another;

each of said mobile stations comprising an internal timer which starts to operate as the respective mobile station enters a respective cell and when the respective mobile station has stayed in the respective cell for at least a predetermined period of time measured by said time, activates the respective mobile station to initiate in the cellular radio network a procedure in which the cellular radio network determines a temporary mobile-specific paging area for the respective mobile station within the current location area of the respective mobile station and stores the respective temporary paging area of the respective mobile station in the location data, the temporary mobile-specific paging area comprising at least the current location cell and possibly at least one adjacent cell and containing fewer cells than a respective location area;

said storing means being arranged to store, in addition to the location area, said temporary paging area until the mobile station has entered a new location area or initiated a procedure for determining a new temporary paging area;

said cellular radio network being arranged to conduct any paging of any one of said mobile stations first in a temporary paging area indicated by the location data of said respective mobile station in said storing means, if the location data contains said temporary paging area in addition to said location area; and said cellular radio network being arranged to conduct any paging of any one of said mobile stations in the location area indicated by the location data of said respective mobile station in said storing means, if the location data contains only said location area.

* * * * *